United States Patent
Herffurth et al.

(10) Patent No.: US 6,702,397 B2
(45) Date of Patent: Mar. 9, 2004

(54) WHEEL HEAD FOR WHEEL GUIDES OF VEHICLES, IN PARTICULAR COMMERCIAL VEHICLES

(75) Inventors: Rainer Herffurth, Fuldatal (DE); Uwe Mierisch, Baunatal (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/920,061

(22) Filed: Aug. 1, 2001

(65) Prior Publication Data

US 2002/0024251 A1 Feb. 28, 2002

(30) Foreign Application Priority Data

Aug. 30, 2000 (DE) .......................................... 100 37 828

(51) Int. Cl.⁷ .............................................. B60B 27/00
(52) U.S. Cl. ..................................... 301/105.1; 301/131
(58) Field of Search ........................... 301/6.1, 6.7, 6.8, 301/35.61, 35.621, 35.63, 105.1, 126, 131; 180/258, 259

(56) References Cited

U.S. PATENT DOCUMENTS

| 1,973,837 | A | * | 9/1934 | Youngren |
| 2,037,982 | A | * | 4/1936 | Hughes |
| 2,086,500 | A | * | 7/1937 | Herrington |
| 2,264,785 | A | * | 12/1941 | Ash |
| 2,271,849 | A | * | 3/1942 | Wallace |
| 2,341,755 | A | * | 2/1944 | Ash |
| 2,599,013 | A | * | 6/1952 | Pringle |
| 4,792,020 | A | * | 12/1988 | Okumura et al. |

FOREIGN PATENT DOCUMENTS

EP            0 852 299        7/1998

* cited by examiner

Primary Examiner—Russell D. Stormer
(74) Attorney, Agent, or Firm—Kenyon & Kenyon

(57) ABSTRACT

For a wheel head for wheel guides of vehicles, in particular commercial vehicles, the wheel flange which is held via a supporting bushing is connected releasably to the supporting bushing.

11 Claims, 2 Drawing Sheets

WHEEL HEAD FOR WHEEL GUIDES OF VEHICLES, IN PARTICULAR COMMERCIAL VEHICLES

FIELD OF THE INVENTION

The present invention relates to a wheel head for wheel guides of vehicles, in particular commercial vehicles.

BACKGROUND INFORMATION

European Published Patent Application No. 0 852 299 describes a device, in which the wheel flange and the supporting sleeve for the inner ring of the wheel mounting form an integral constructional unit where the supporting sleeve is supported against the inner ring on the wheel side via a shoulder and the inner ring is overlapped on the wheel guide side by a bent-up edge of the supporting sleeve. As a result, the wheel flange, supporting sleeve and wheel bearing form a constructional unit which, via the outer ring of the wheel mounting, can be fixed in a bushing-like holder which is provided in the transition to the wheel guide in a corresponding guide part which may be formed, for example, by a region of an axle stub or wheel carrier. The axial fixing of the outer ring in the bushing-like holder takes place in the direction of the wheel guide via a fixed stop and in the opposite direction by a snap element. The wheel flange and supporting sleeve form a relatively complicated and expensive integral constructional unit which does not permit separate access to the wheel mounting and, in particular, also does not provide any subsequent adjustment options. In addition, the access to the wheel mounting for removal purposes is also made more difficult and requires corresponding axial and radial clearances between the wheel flange and bushing-like holder for the wheel mounting.

It is an object of the present invention to provide a wheel head having improved engineering and installation characteristics.

SUMMARY

The above and other beneficial objects of the present invention are achieved by providing a wheel head as described herein. According to an example embodiment of the present invention, a wheel head includes a wheel flange and a supporting sleeve, each as an individual part. As a result, the manufacturing is simplified, and different manufacturing methods and different materials for the wheel flange and supporting sleeve may be used. In addition, the distance between the wheel flange and supporting sleeve may be reduced to a minimum or, depending on a predetermined overall length, the supporting sleeve may be extended axially and therefore additional constructional space for the wheel mounting obtained, so that with the smallest possible overall dimensions and/or with the wheel head projecting a substantial distance into the wheel to be mounted, large bearing dimensions with improved loading ratios are also possible. This arrangement may be particularly advantageous as to a support of the respective brake disc against that side of the wheel flange which faces away from the wheel, in which case the arrangement of the brake disc of a disc brake provides improved options for installation and access despite the cramped design.

The arrangement according to the present invention furthermore also provides that the wheel head may be used in an identical manner both for driven and for non-driven wheels, it being possible for both forms of use to optionally be realized via supporting sleeves of standardized design or via separate supporting sleeves. In particular if, with regard to the respective intended purpose, supporting sleeves which are designed separately are used, the latter may be produced in a particularly favorable manner for non-driven axles by omitting the offset or toothing connections, which are necessary in the case of driven axles, to the driveshaft which engages in the supporting sleeve. The use of supporting sleeves of different design may be advantageous in the use of a wheel head, which is otherwise of identical design, for mass production.

Overall, the present invention provides a uniform concept for wheel heads both for driven and for non-driven front and rear axles, irrespective of whether the axles have single tires or dual tires. Trailing axles may also be configured in a corresponding manner, in which case use may be made of compact bearings standardized by weight class, supporting sleeves standardized as a function of the bearing dimensions and also brake discs standardized merely as a function of the wheel size. The wheel head according to the present invention is therefore distinguished by extensive options for standardization and for the use of identical parts, and it provides particular advantages especially also with regard to changing of the brake disc, since removal of the bearing is not required.

DETAILED DESCRIPTION

Figure 1:
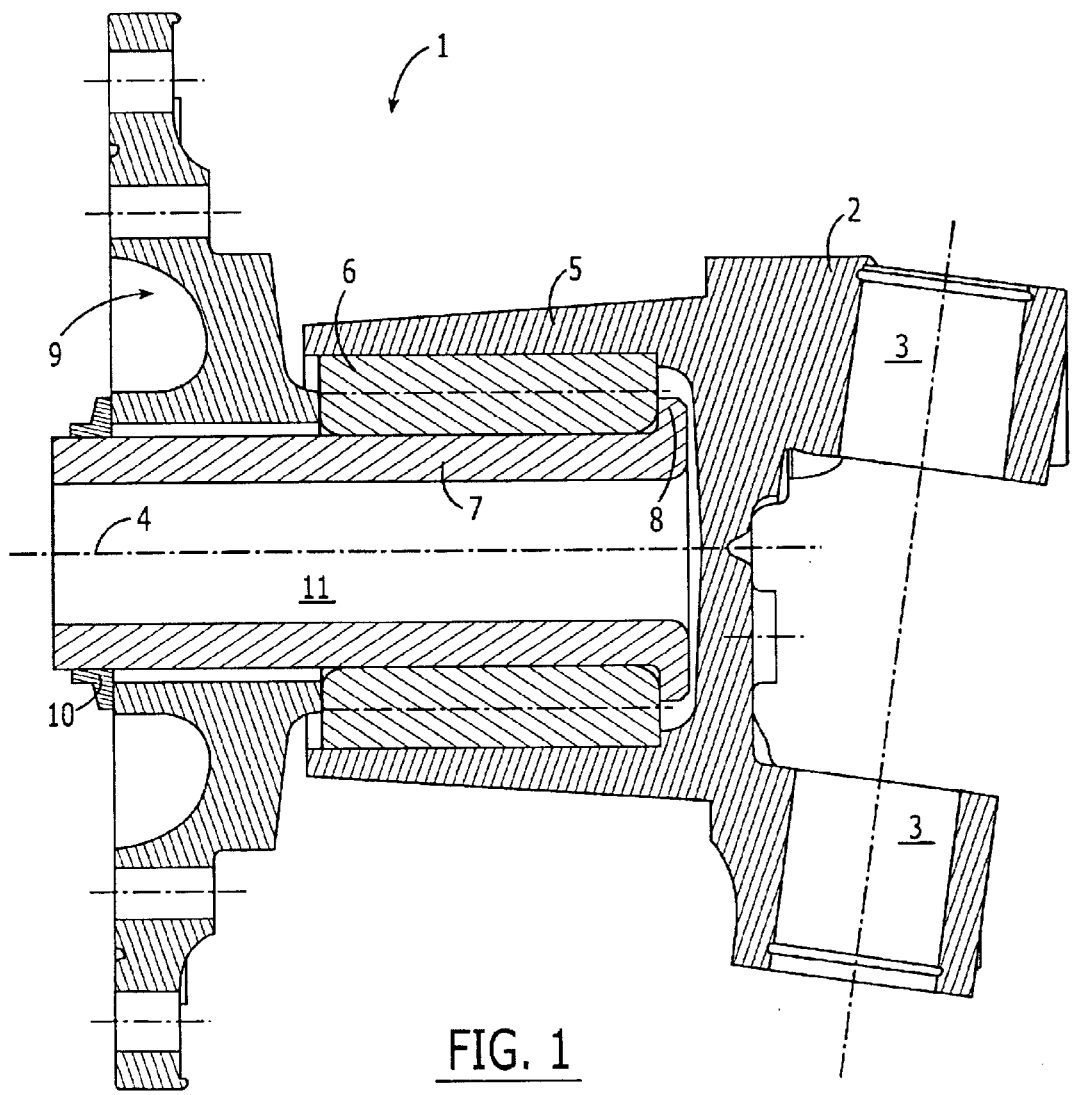
FIG. 1 is a schematic cross-sectional view of a wheel head according to the present invention.

Starting from a wheel guide which may be configured in a conventional manner as an independent wheel suspension, as a rigid axle or in another manner, and via which the wheel head 1 is connected to the respective vehicle, an axle stub 2 is illustrated schematically in FIG. 1 as a transition element between the wheel head 1 and wheel guide, the axle stub having, in a conventional manner, orifices 3 for accommodating an axle stub bolt or other bearing elements via which the connection to the wheel guide occurs. Instead of an axle stub 2 of the type illustrated, other transition elements, for example wheel carriers or the like, may also be provided. Furthermore, for example in the case of an unsteered rigid axle, the transition element may also be formed by part of the axle body itself, in which case the axle body, as illustrated in FIG. 1 for the axle stub 2, includes a bushing-like holder 5 which is concentric with respect to the wheel axle 4. In the example embodiment of the present invention illustrated in FIG. 1, this bushing-like holder is of integral design with the axle stub 2 and forms the outer support for the wheel mounting 6 (indicated schematically) which is arranged radially on the inside on a supporting sleeve 7 which, at its end disposed in the holder 5 and facing the wheel guide, grips radially behind the wheel mounting 6 and is thereby supported axially. The bracing, which positions the wheel flange 9, against the corresponding, annular stop collar 8 occurs via a clamping nut 10 which is screwed axially onto the wheel-side end of the supporting sleeve 7. The wheel flange 9 may be pushed onto the supporting sleeve 7 and connected to the supporting sleeve 7 in a torque-transmitting manner, in particular in a positive-locking manner, for example via a splined toothing or the like.

The supporting sleeve 7 includes an internal hole 11, so that in the case of an appropriate configuration of the axle stub 2 with a passage opening, a connection to a drive shaft is possible, with the result that with the same basic configuration of the wheel head 1, the latter may be used both for driven and non-driven axles, in which case, for driven axles, the internal hole 11 includes a torque-transmitting profile, for example a splined toothing or the like.

Figure 2:
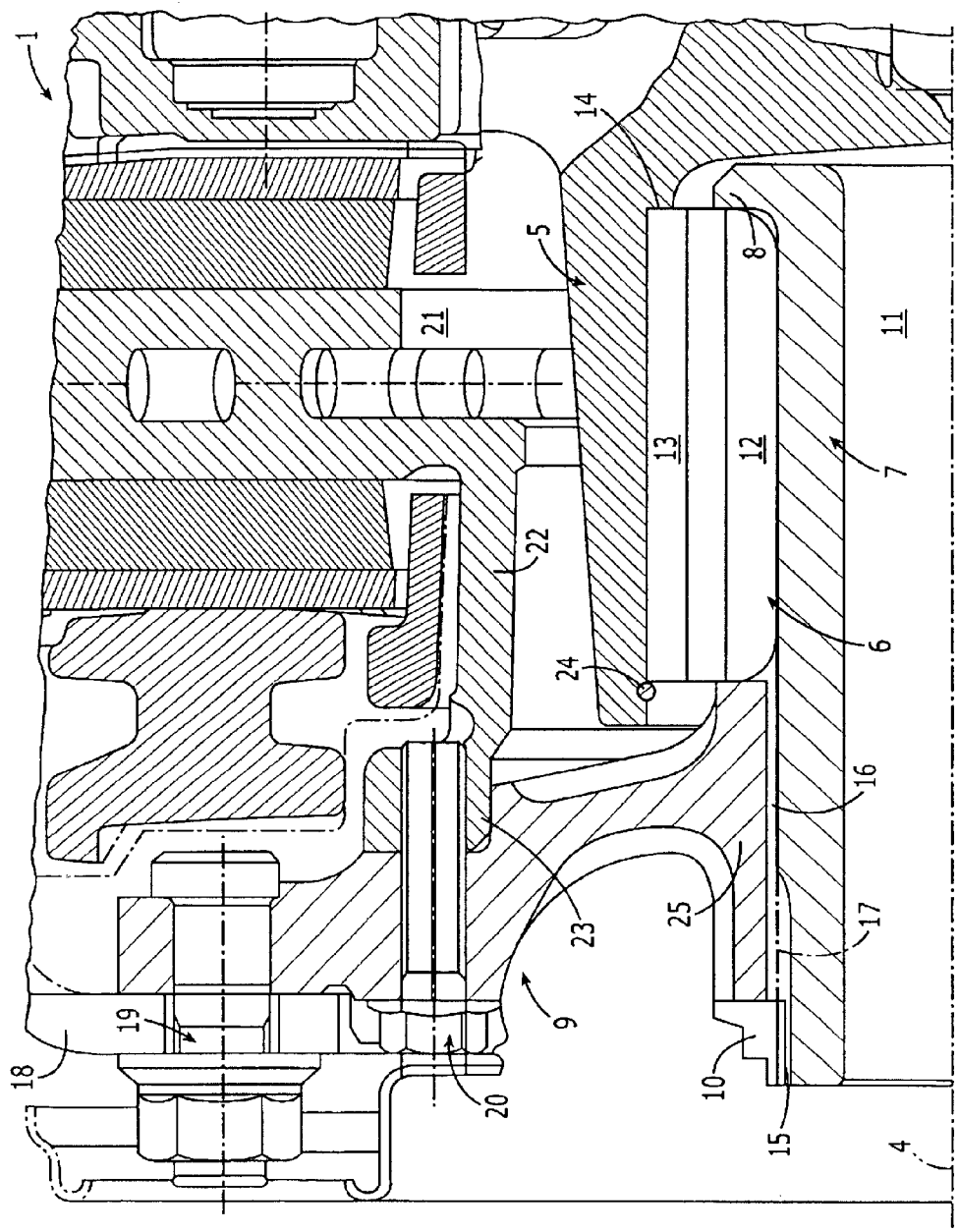
FIG. 2 is another schematic cross-sectional view of the wheel head illustrated in FIG. 1.

FIG. 2 illustrates a more detailed illustration of a cutout of the wheel head 1, in which, with regard to the wheel mounting 6, its inner ring 12 and its outer ring 13 are indicated, and the respective, axial bracing of the inner ring 12 and of the outer ring 13 with respect to the supporting sleeve 7 and the bushing-like holder 5, respectively. The outer ring 13 is supported on the wheel guide side against a radial collar 14 of the holder 5, and on the opposite side is secured by a snap ring 24 or the like. The inner ring 12 is supported via the stop collar 8. The wheel flange 9 is supported via its collar 25, which is arranged radially on the inside, on the supporting sleeve 7. Furthermore, the wheel flange 9 may taper radially on an inside into the collar 25. The collar 25 which extends axially is pressed via the clamping nut 10 which is screwed onto an end-side thread 15 of the supporting sleeve 7. The collar 25 is connected in a torque-transmitting manner to the supporting sleeve 7, for example via a toothing 16, and as FIG. 2 illustrates, is braced radially, e.g., also via a clamping pin or the like, as indicated at 17.

The wheel flange 9 bears the wheel screw connection 19 radially on the outside in the overlapping region to the wheel disc 18 which is indicated. Radially within the wheel disc 18 the wheel flange 9 is passed through by clamping screws 20 which are arranged at the head end in a radial overlap with respect to the wheel disc 18 and via which the brake disc 21 is connected, by its supporting collar 22 which is disposed radially on the inside and extends axially being positioned, to the wheel flange 9 in an axially braced manner, in which case the wheel flange 9 forms a radial guide via a supporting shoulder 23.

The example embodiment of the present invention illustrated results in an axially short construction, to which a contribution is made by the corresponding, axially superimposed and radially mutually offset arrangement of the wheel screw connection 19 with respect to the clamping screws 20, in conjunction with the connection, which is offset into the direction of the wheel guide, of the supporting collar 22 of the brake disc 21 which, for its part, surrounds the bushing-like holder 5 radially at a relatively short distance. Despite the cramped construction, a relatively large axial supporting length is provided, so that a favorable bearing arrangement and configuration is possible, even in its position with respect to the longitudinal central plane of the wheel, since the wheel head 1 may, due to its cramped configuration, be arranged so that it is inserted to a substantial depth into the wheel nave.

Moreover, the arranged described above makes possible, with all essential elements being retained, the use of substantially identical wheel heads both for driven and for non-driven wheels, in which case for driven wheels the supporting sleeve 7 forms, by its internal hole 11, a holder for a driveshaft which passes through the axle stub, in which case the corresponding passage opening may simultaneously form a bearing for the driveshaft or a joint assigned to the latter.

What is claimed is:

1. A wheel head for a wheel guide of a vehicle, comprising:
   a wheel flange;
   a disc brake, the wheel flange supporting the disc brake;
   a supporting sleeve connected to the wheel flange;
   a bushing-like holder arranged adjacent to the wheel guide;
   an axially fixed wheel mounting including an outer ring arranged in the bushing-like holder and an inner ring arranged on the supporting sleeve, the wheel flange being arranged in a region disposed on a wheel side of the wheel head and being supported against the inner ring; and
   a clamping nut;
   wherein the wheel flange and the supporting sleeve are independent parts, the wheel flange being pushed onto the supporting sleeve and connected to the supporting sleeve in a positive-locking and rotationally fixed manner, the clamping nut pressing the wheel flange axially against the inner ring corresponding to a wheel-side end of the supporting sleeve.

2. The wheel head according to claim 1, wherein the brake disc is supported against a side of the wheel flange facing the wheel guide.

3. The wheel head according to claim 2, wherein the wheel flange includes a supporting shoulder, the brake disc being radially supported against the supporting shoulder of the wheel flange.

4. The wheel head according to claim 2, wherein the brake disc is braced axially against the wheel flange.

5. The wheel head according to claim 4, wherein the brake disc is screwed to the wheel flange.

6. The wheel head according to claim 1, wherein the wheel flange includes an inside, the wheel flange tapering radially on the inside of the wheel flange into a collar, the collar extending axially to the bushing-like holder and covering the supporting sleeve in a connecting region of the supporting sleeve.

7. The wheel head according to claim 1, wherein the wheel-side end of the supporting sleeve includes an external thread configured to mate with the clamping nut.

8. The wheel head according to claim 1, wherein an end of the supporting sleeve facing the wheel guide includes an annular stop collar configured to engage the inner ring.

9. The wheel head according to claim 1, wherein the bushing-like holder and the brake disc are arranged to axially overlap.

10. The wheel head according to claim 1, further comprising an axially extending supporting collar to connect the brake disc to the wheel flange.

11. The wheel head according to claim 10, wherein the supporting collar, the bushing-like holder and the supporting sleeve are arranged concentrically and axially overlap.

* * * * *